United States Patent
Liu

(10) Patent No.: US 11,134,422 B2
(45) Date of Patent: Sep. 28, 2021

(54) RANDOM ACCESS METHOD, TERMINAL DEVICE AND NETWORK DEVICE

(71) Applicant: Guangdong OPPO Mobile Telecommunications Corp., Ltd., Guangdong (CN)

(72) Inventor: Jianhua Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 126 days.

(21) Appl. No.: 16/487,078

(22) PCT Filed: Feb. 28, 2017

(86) PCT No.: PCT/CN2017/075244
§ 371 (c)(1),
(2) Date: Aug. 19, 2019

(87) PCT Pub. No.: WO2018/157298
PCT Pub. Date: Sep. 7, 2018

(65) Prior Publication Data
US 2019/0380071 A1 Dec. 12, 2019

(51) Int. Cl.
*H04W 36/00* (2009.01)
*H04W 74/08* (2009.01)
(Continued)

(52) U.S. Cl.
CPC ....... *H04W 36/0077* (2013.01); *H04W 36/08* (2013.01); *H04W 74/0833* (2013.01); *H04W 76/19* (2018.02); *H04W 76/27* (2018.02)

(58) Field of Classification Search
CPC . H04W 36/0077; H04W 36/08; H04W 76/19; H04W 76/27; H04W 74/0833
See application file for complete search history.

(56) References Cited

U.S. PATENT DOCUMENTS 8,811,244 B2  8/2014  Lee
2015/0289292 A1  10/2015  Sun et al.
(Continued)

FOREIGN PATENT DOCUMENTS

CN  101212796 A  12/2006
CN  101588637 A  11/2009
(Continued)

OTHER PUBLICATIONS

R1-1700703, '2-step random access procedure', InterDigital Communications, 3GPP TSG RAN WG1 AH_NR Meeting, pp. 1-4, Jan. 16-20, 2017. (Year: 2017).*
(Continued)

*Primary Examiner* — Melvin C Marcelo
(74) *Attorney, Agent, or Firm* — Young Basile Hanlon & MacFarlane, P.C.

(57) ABSTRACT

A random access method, a terminal device and a network device are provided. The method includes: selecting randomly, by a terminal device, a preamble for the terminal device to perform random access from multiple preambles; sending, by the terminal device, a first message to the network device, wherein the first message includes the preamble, random access information and an index for indicating a size of the random access information, and the random access information is control signaling related to Radio Resource Control (RRC) sent by the terminal device or data sent by the terminal device based on a random access event.

20 Claims, 8 Drawing Sheets

(51) Int. Cl.
*H04W 76/27* (2018.01)
*H04W 76/19* (2018.01)
*H04W 36/08* (2009.01)

(56) References Cited

U.S. PATENT DOCUMENTS

2018/0205516 A1* 7/2018 Jung .................... H04L 5/0007
2019/0320467 A1* 10/2019 Freda ................ H04W 74/0833

FOREIGN PATENT DOCUMENTS

| CN | 104754758 A | 7/2015 |
|---|---|---|
| KR | 20150115685 A | 10/2015 |
| WO | 2016089146 A1 | 9/2016 |
| WO | 2017023066 A1 | 2/2017 |
| WO | 2017191834 A1 | 11/2017 |

OTHER PUBLICATIONS

Communication pursuant to Article 94(3) EPC Examination for EP Application 17898647.7 dated Sep. 30, 2020.
3GPP TSG RAN WG2 NR Adhoc; R2-1700137; Spokane, USA, Jan. 17-19, 2017.
3GPP TSG-RAN WG2 NR Ad Hoc; Spokane, USA, Jan. 17-19, 2017.
Extended Search Report for EP Application No. 17898647.7 dated Jan. 17, 2020.
3GPP TSG RAN WG2 Meeting AH_NR Meeting; Spokane, USA, Jan. 17-19, 2017; R1-1700471.
Japan First Office Action with English Translation for JP Application 2019-543971 dated Mar. 23, 2021. (8 pages).
European Examination Report for EP Application 17898647.7 dated Jan. 26, 2021. (5 pages).
India First Examination Report for IN Application 201917037125 dated Feb. 5, 2021. (5 pages).
Nokia, On 2-step Random Access Procedure, 3GPP TSG-RAN WG1 AH_NR Meeting, R1-1700652, Jan. 16-20, 2017. (5 pages).
Samsung, NR 2-step random access procedure, 3GPP TSG RAN WG1 NR Ad Hoc, R1-1700892, Jan. 16-20, 2017. (5 pages).
Korean Office Action with English Translation for KR Application 10-2019-7027124 dated Jun. 14, 2021. (16 pages).
LG Electronics, Discussion on 2 step RACH, 3GPP TSG RAN WG1 NR Ad-Hoc Meeting, R1-1700464, Jan. 16-20, 2017. (3 pages).
Huawei, HiSilicon, Discussion on 2-step RACH Procedure, 3GPP TSG-RAN2 Meeting #96, R2-167588, Nov. 14-18, 2016. (3 pages).
Asustek, Consideration on fallback of 2-step RACH procedure, 3GPP TSG-RAN WG2 Meeting #NR Ad Hoc, R2-1700024, Jan. 17-19, 2017 (4 pages).

* cited by examiner

RANDOM ACCESS METHOD, TERMINAL DEVICE AND NETWORK DEVICE

CROSS-REFERENCE TO RELATED APPLICATION(S)

This application is a 371 application of International Application No. PCT/CN2017/075244, filed on Feb. 28, 2017, the entire disclosure of which is hereby incorporated by reference.

TECHNICAL FIELD

Implementations of the present disclosure relate to the field of wireless communication, and more specifically, to a random access method, a terminal device and a network device.

BACKGROUND

In a 5G system, when a terminal device performs random access, 2-step Random Access (RA) can be used, i.e., as a first step, Message (Msg) 1, namely a preamble, and Msg 3 in a 4-step Random Access (4-step RA) process in a Long Term Evolution (LTE) system are sent. The 2-step RA is mainly applied to some low-power access points (small cells) or stationary terminal devices and other cases in which Time Advance (TA) is not required. Since in the 4-step RA process, Msg 1 and Msg 2 are mainly used for obtaining a TA value to achieve uplink synchronization.

However, in the 2-step RA, a base station may not successfully receive the preamble or the Msg 3, resulting in a random access failure. If the base station only successfully receives the preamble but does not successfully receive the Msg 3, then the terminal device needs to fall back to the 4-step RA to continue to complete this random access. Therefore, how to enable the terminal device to freely choose the 2-step RA or the 4-step RA is a problem to be solved urgently.

SUMMARY

Implementations of the present disclosure provide a random access method, a terminal device and a network device, enabling the terminal device to flexibly select 2-step Random Access or 4-step Random Access to implement random access.

In a first aspect, a random access method is provided, wherein the method includes: selecting randomly, by a terminal device, a preamble for the terminal device to perform random access from multiple preambles;

sending, by the terminal device, a first message to a network device, wherein the first message includes the preamble, random access information, and an index for indicating a size of the random access information, and the random access information is control signaling related to Radio Resource Control (RRC) sent by the terminal device or data sent by the terminal device based on a random access event.

Optionally, in an implementation mode of the first aspect, the random access information includes any one of the following: an RRC connection request for performing initial access, RRC handover confirmation information for indicating a completion of a cell handover, an RRC connection reestablishment request for requesting an RRC connection reestablishment, uplink data, and feedback information for downlink data.

Optionally, in an implementation mode of the first aspect, if the network device does not successfully receive the random access information, the method further includes: receiving, by the terminal device, a Random Access Response (RAR) sent by the network device according to the index, wherein the RAR includes uplink resource information for the terminal device to resend the random access information; resending, by the terminal device, the random access information to the network device according to the RAR.

Optionally, in an implementation mode of the first aspect, if the network device successfully receives the random access information, the method further includes: receiving, by the terminal device, a feedback message sent by the network device according to the first message, wherein the feedback message is used for indicating a completion of the random access event.

Optionally, in an implementation mode of the first aspect, before the terminal device sends the first message to the network device, the method further includes: determining, by the terminal device, the index corresponding to the size of the random access information according to the size of the random access information and a first mapping relationship, wherein the first mapping relationship includes a corresponding relationship between multiple data sizes and multiple index values.

Optionally, in an implementation mode of the first aspect, before the terminal device determines the index corresponding to the size of the random access information, the method further includes: receiving, by the terminal device, indication information sent by the network device, wherein the indication information is used for indicating the first mapping relationship.

In a second aspect, a random access method is provided, wherein the method includes: receiving, by a network device, a first message sent by a terminal device, wherein the first message includes a preamble for random access, random access information and an index for indicating a size of the random access information, and the random access information is control signaling related to Radio Resource Control (RRC) sent by the terminal device or data sent by the terminal device based on a random access event;

determining, by the network device, whether the network device successfully receives the random access information sent by the terminal device;

if the network device successfully receives the random access information sent by the terminal device, then sending, by the network device, a feedback message for indicating completion of the random access event to the terminal device according to the first message; or if the network device does not successfully receive the random access information sent by the terminal device, then sending, by the network device, a Random Access Response (RAR) to the terminal device, wherein the RAR includes uplink resource information for the terminal device to resend the random access information.

Optionally, in an implementation mode of the second aspect, the random access information includes any one of the following: an RRC connection request for performing initial access, RRC handover confirmation information for indicating the completion of a cell handover, an RRC connection reestablishment request for requesting an RRC connection reestablishment, uplink data, and feedback information for downlink data.

Optionally, in an implementation mode of the second aspect, before the network device receives the first message sent by the terminal device, the method further includes:

sending, by the network device, a first mapping relationship to the terminal device, wherein the first mapping relationship includes a corresponding relationship between multiple data sizes and multiple index values, to enable the terminal device to determine the index corresponding to the size of the random access information according to the size of the random access information and the first mapping relationship.

In a third aspect, a terminal device is provided, and the terminal device may perform operations of the terminal device in the first aspect or any possible implementation mode of the first aspect described above. Specifically, the terminal device may include modules used for performing the operations of the terminal device in the first aspect or any possible implementation mode of the first aspect described above.

In a fourth aspect, a network device is provided, and the network device may perform operations of the network device in the second aspect or any possible implementation mode of the second aspect described above. Specifically, the network device may include modules used for performing the operations of the network device in the second aspect or any possible implementation mode of the second aspect described above.

In a fifth aspect, a terminal device is provided and the terminal device includes: a processor, a transceiver and a memory. The processor, the transceiver and the memory communicate with each other through internal connection paths. The memory is used for storing instructions, and the processor is used for executing the instructions stored in the memory. When the processor executes the instructions stored in the memory, the execution causes the terminal device to perform the method in the first aspect or in any possible implementation mode of the first aspect, or the execution causes the terminal device to realize the terminal device provided by the third aspect.

In a sixth aspect, a network device is provided, and the network device includes: a processor, a transceiver and a memory. The processor, the transceiver and the memory communicate with each other through internal connection paths. The memory is used for storing instructions, and the processor is used for executing the instructions stored in the memory. When the processor executes the instructions stored in the memory, the execution causes the network device to perform the method in the second aspect or in any possible implementation mode of the second aspect, or the execution causes the network device to realize the network device provided by the fourth aspect.

In a seventh aspect, a computer-readable storage medium is provided, and the computer-readable storage medium stores a program, wherein the program causes a terminal device to perform any random access method in the first aspect and various implementation modes of the first aspect described above.

In an eighth aspect, a computer-readable storage medium is provided, and the computer-readable storage medium stores a program, wherein the program causes a network device to perform any random access method in the second aspect and various implementation modes of the second aspect described above.

In a ninth aspect, a system chip is provided, and the system chip includes an input interface, an output interface, a processor, and a memory. The processor is used for executing instructions stored in the memory, and when the instructions are executed, the processor may implement any method in the first aspect and various implementation modes of the first aspect described above.

In a tenth aspect, a system chip is provided, and the system chip includes an input interface, an output interface, a processor, and a memory. The processor is used for executing instructions stored in the memory, and when the instructions are executed, the processor may implement any method in the second aspect and various implementation modes of the second aspect described above.

DETAILED DESCRIPTION

In the following, technical solutions in implementations of the present disclosure are described with reference to the accompanying drawings.

It should be understood that the technical solutions of the implementations of the present disclosure can be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, a LTE Frequency Division Duplex (FDD) system, LTE Time Division Duplex (TDD), a Universal Mobile Telecommunication System (UMTS), and a future 5G communication system.

Various implementations are described herein in connection with terminal devices. The terminal devices may also be referred to as User Equipment (UE), access terminals, subscriber units, subscriber stations, mobile stations, mobile platforms, remote stations, remote terminals, mobile devices, user terminals, terminals, wireless communication devices, user agents or user devices. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, an on-board device, a wearable device, a terminal device in a future 5G network, or a terminal device in a future evolved Public Land Mobile Network (PLMN), etc.

Various implementations are described herein in connection with network devices. A network device may be a device for communicating with a terminal device, such as a base station (Base Transceiver Station, referred to as "BTS") in a GSM system or CDMA, a base station (NodeB, referred to as "NB") in a WCDMA system, or an evolved base station (Evolutional Node B, referred to as "eNB" or "eNodeB") in a LTE system, or the network device may be a relay station, an access point, a vehicle-mounted device, a wearable device, or a network side device in a future 5G network or a network side device in a future evolved PLMN network.

Figure 1:
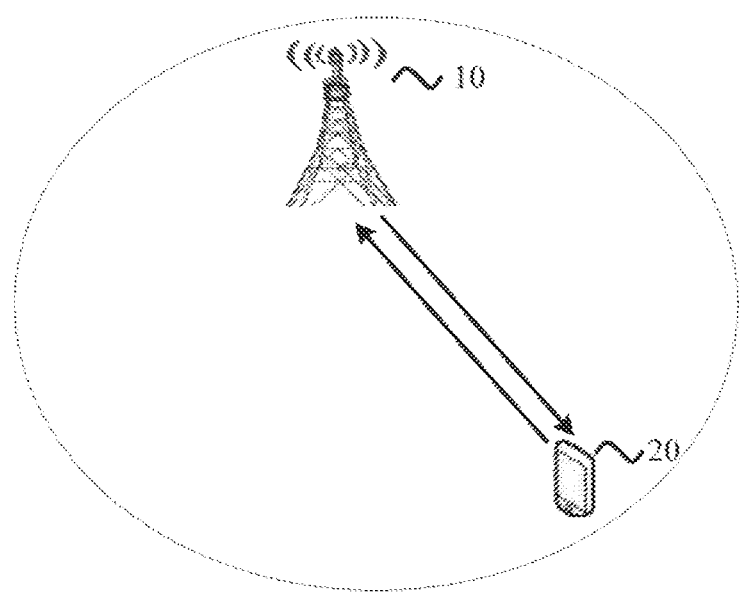
FIG. 1 is a schematic architecture diagram of an application scenario according to an implementation of the present disclosure.

FIG. 1 is a schematic diagram of an application scenario of an implementation of the present disclosure. The communication system in FIG. 1 may include a network device 10 and a terminal device 20. The network device 10 is used for providing communication services for the terminal device 20 and accessing to a core network. The terminal device 20 may access to a network by searching for a synchronization signal, or a broadcast signal, etc., sent by the network device 10 to communicate with the network. Arrows shown in FIG. 1 may represent uplink/downlink transmission through cellular links between the terminal device 20 and the network device 10.

The network in an implementation of the present disclosure may refer to a Public Land Mobile Network (PLMN) or a Device-to-Device (D2D) network or a Machine to Machine/Man (M2M) network or other networks. FIG. 1 is a simplified schematic diagram of an example, and other terminal devices may be included in the network, which are not shown in FIG. 1.

Figure 2:
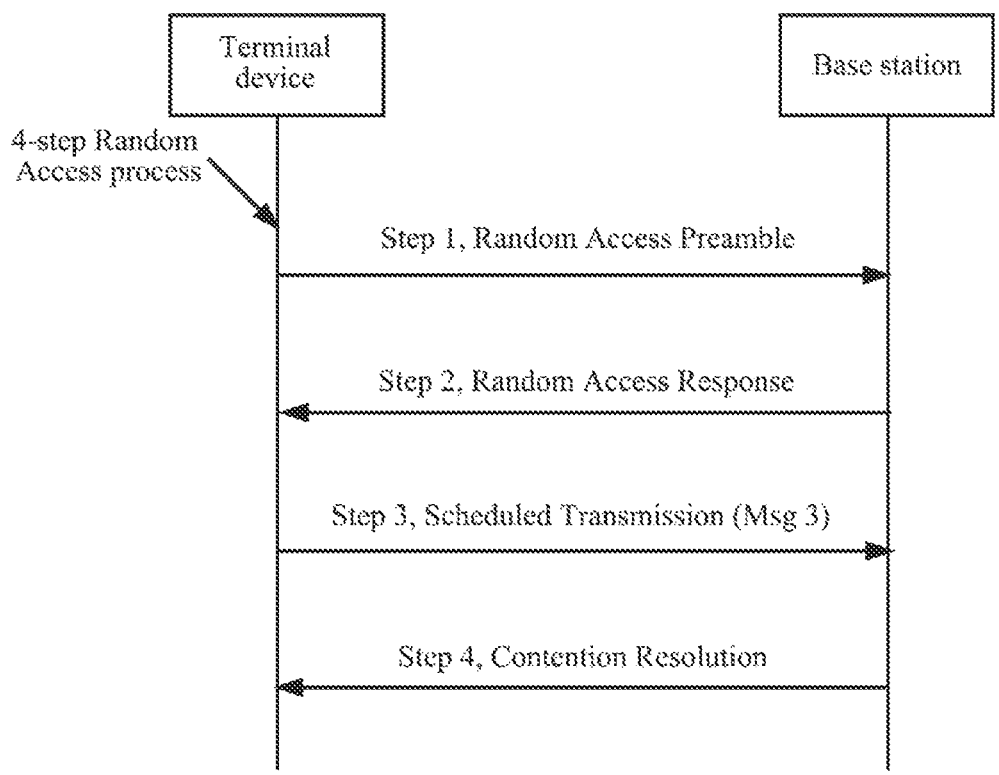
FIG. 2 is a flowchart of interaction in 4-step Random Access in the prior art.

FIG. 2 is a flowchart of interaction in 4-step Random Access. As shown in FIG. 2, the random access process includes the following four steps:

Step 1, Msg 1.

A terminal device sends a base station Msg 1, namely a random access request, which carries a Random Access Preamble, or referred to as a preamble.

Step 2, Msg 2.

After receiving the Msg 1 sent by the terminal device, the base station sends the terminal device Msg 2, namely a Random Access Response (RAR), which carries a Time Advance (TA), an uplink granting instruction (such as a configuration of a uplink resource), and a Cell-Radio Network Temporary Identifier (C-RNTI), etc.

Step 3, Msg 3.

After receiving the RAR, the terminal device determines whether the RAR is its own RAR message, for example, checking by using a preamble IDentity, and after determining that the RAR is its own RAR, the terminal device generates Msg 3 at a Radio Resource Control (RRC) layer, and sends the Msg 3, for example, an RRC Connection Request message, to the base station, for performing Scheduled Transmission, wherein the Msg 3 carries an Identity (ID) of the terminal device, etc.

Step 4, Msg 4.

The base station sends Msg 4 to the terminal device. The terminal device correctly receives the Msg 4 to complete Contention Resolution. For example, in a process of RRC connection establishment, the Msg 4 carries an RRC connection establishment message.

Step 5, Msg 5.

The terminal device sends Msg 5 to the base station to confirm that a configuration in the Msg 4 takes effect. For example, in a process of RRC connection establishment, the Msg 5 carries an RRC establishment completion message.

In a 5G system, when the terminal device performs random access, besides the terminal device may use the above-mentioned 4-step Random Access to perform the random access, the terminal device may also use a 2-step Random Access process, i.e., in Step 1, the terminal device sends a message Msg 1, namely a preamble, in the 4-step Random Access process, and Msg 3.

Figure 3:
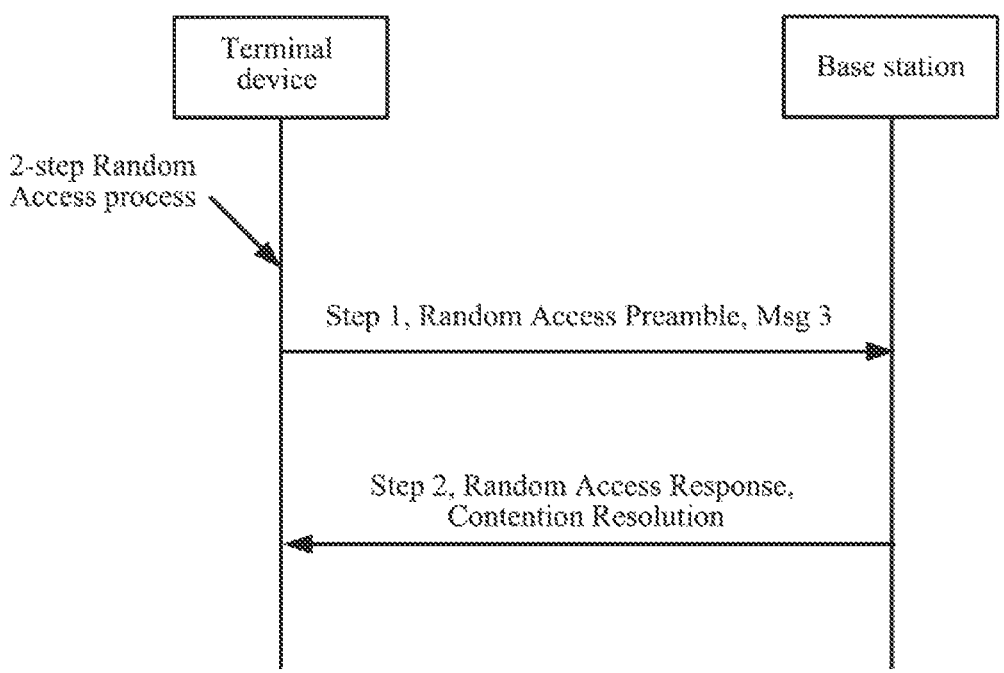
FIG. 3 is a flowchart of interaction in 2-step Random Access in the prior Art.

FIG. 3 shows a flowchart of interaction in 2-step Random Access.

In Step 1, a terminal device sends a preamble and Msg 3 to a base station.

In Step 2, if the base station successfully receives the preamble and the Msg 3 sent by the terminal device, then the base station sends an RAR and a connection resolution message to the terminal device.

However, in the 2-step Random Access process, the base station may not successfully receive the preamble or the Msg 3, resulting a random access failure. If the base station only successfully receives the preamble while does not successfully receive the Msg 3, then the terminal device may fall back to a 4-step Random Access process to continue to complete this random access.

Figure 4:
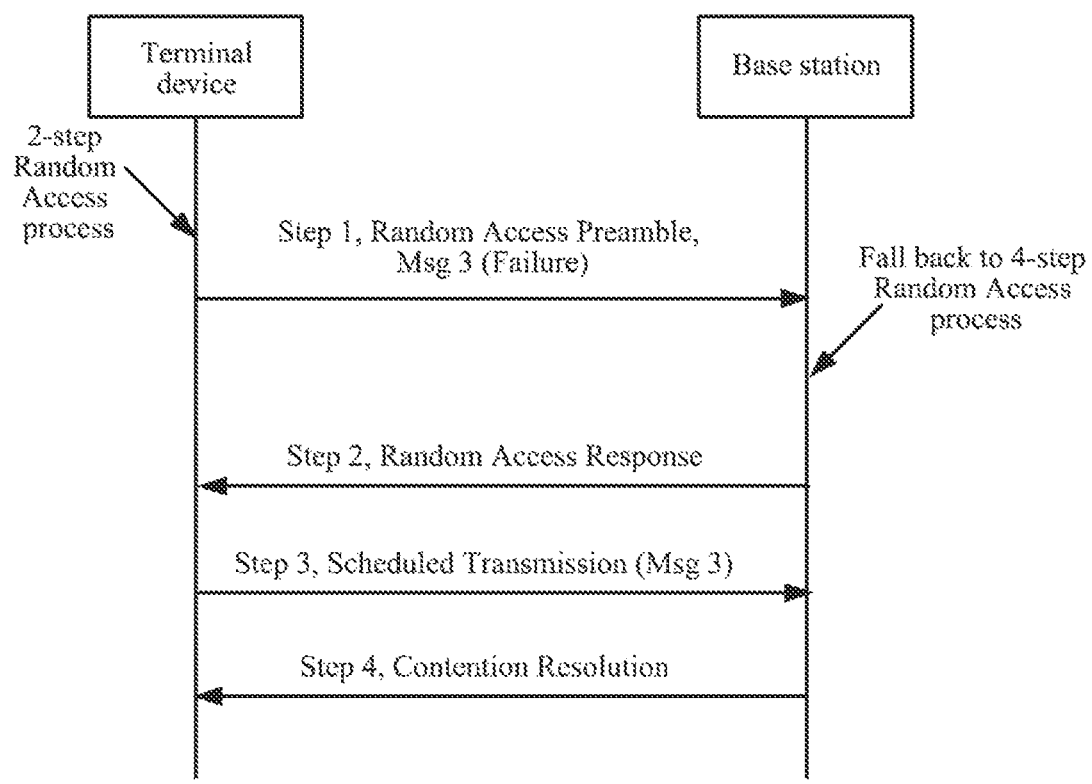
FIG. 4 is a flowchart of interaction in switching between 2-step Random Access and 4-step Random Access.

FIG. 4 shows a flowchart of interaction in switching between 2-step Random Access and 4-step Random Access.

In Step 1, a terminal device sends a preamble and Msg 3 to a base station.

However, the base station only successfully receives the preamble while does not successfully receive the Msg 3, at this time the terminal device falls back to a 4-step Random Access process.

In Step 2, the base station sends the terminal device an RAR, which carries a TA value, an uplink granting instruction of the base station for the Msg3, etc.

In Step 3, the terminal device sends Msg 3 to the base station.

In Step 4, the base station sends a connection resolution message to the terminal device.

For different scenarios, there are different random access events (triggering events), the Msg 3 in Step 3 of the 4-step Random Access process may include different contents. For example, for a scenario of initial access, the Msg 3 includes an RRC connection request generated by an RRC layer, which carries a Serving-Temporary Mobile Subscriber Identity (S-TMSI) of the terminal device or a random number; for a scenario of connection reestablishment, the Msg 3 carries an RRC connection reestablishment request generated by an RRC layer, C-RNTI and Protocol Control Information (PCI); for a scenario of handover, the Msg 3 carries an RRC handover completion message generated by an RRC layer and C-RNTI of the terminal device; for a scenario where uplink/downlink data arrive, the Msg 3 carries the C-RNTI of the terminal device.

For these different scenarios, sizes of Msg 3s in Step 3 are also different. At present, multiple preambles may be grouped and each group of preambles may be corresponded to a different size of Msg 3, so that the base station can determine a size of the corresponding Msg 3 according to a received preamble, to perform uplink granting for the Msg 3. However, when the quantity of terminal devices is larger, conflicts may occur when different terminal devices select preambles, thus affecting a random access process severely. For example, when there are too many terminal devices which perform initial access, a probability of selecting a same group of preambles will increase, thus a probability that a confliction of preambles occurs also increases. More-over, since in a 2-step Random Access process, information such as a TA value does not need to be obtained through first two steps in a 4-step Random Access process for transmitting Msg 3, it is also not necessary in the 2-step Random Access process to make a preamble correspond to a size of Msg 3 in the 4-step Random Access process.

In an implementation of the present disclosure, a terminal device can randomly select a preamble from all preambles to perform a 2-step Random Access process. And when the terminal sends the preamble and random access information for different random access events, by indicating a size of the random access information to a network device, the network device is enabled to learn the size of the random access information and grant uplink resources to the r terminal device when the terminal device falls back to a 4-step Random Access from the 2-step Random Access.

It should be understood that when a terminal device performs 2-step Random Access, a message sent to a network device includes not only a preamble but also random access information. And the random access information is control signaling related to Radio Resource Control (RRC) or data sent by the terminal device based on different random access events, such as an RRC connection request for performing initial access, RRC handover confirmation information for indicating a completion of a cell handover, an RRC connection reestablishment request for requesting an RRC connection reestablishment, uplink data to be transmitted which arrive when uplink transmission is unsynchronized or no available PUCCH resources are used for transmitting SR, a feedback message which is for downlink data and arrives when uplink transmission is unsynchronized, etc.

The random access information may be equivalent to Msg 3 sent in a 4-step Random Access process when the terminal device initiates the 4-step Random Access for a same random access event. However, it is different from the Msg 3 in 4-step Random Access in that, in 2-step Random Access, when the random access information is sent to the network device with the preamble being sent to the network device simultaneously, it is not a scheduled transmission, and it is a scheduled transmission only when the terminal device resends the random access information after falling back to the 4-step Random Access from the 2-step Random Access.

Figure 5:
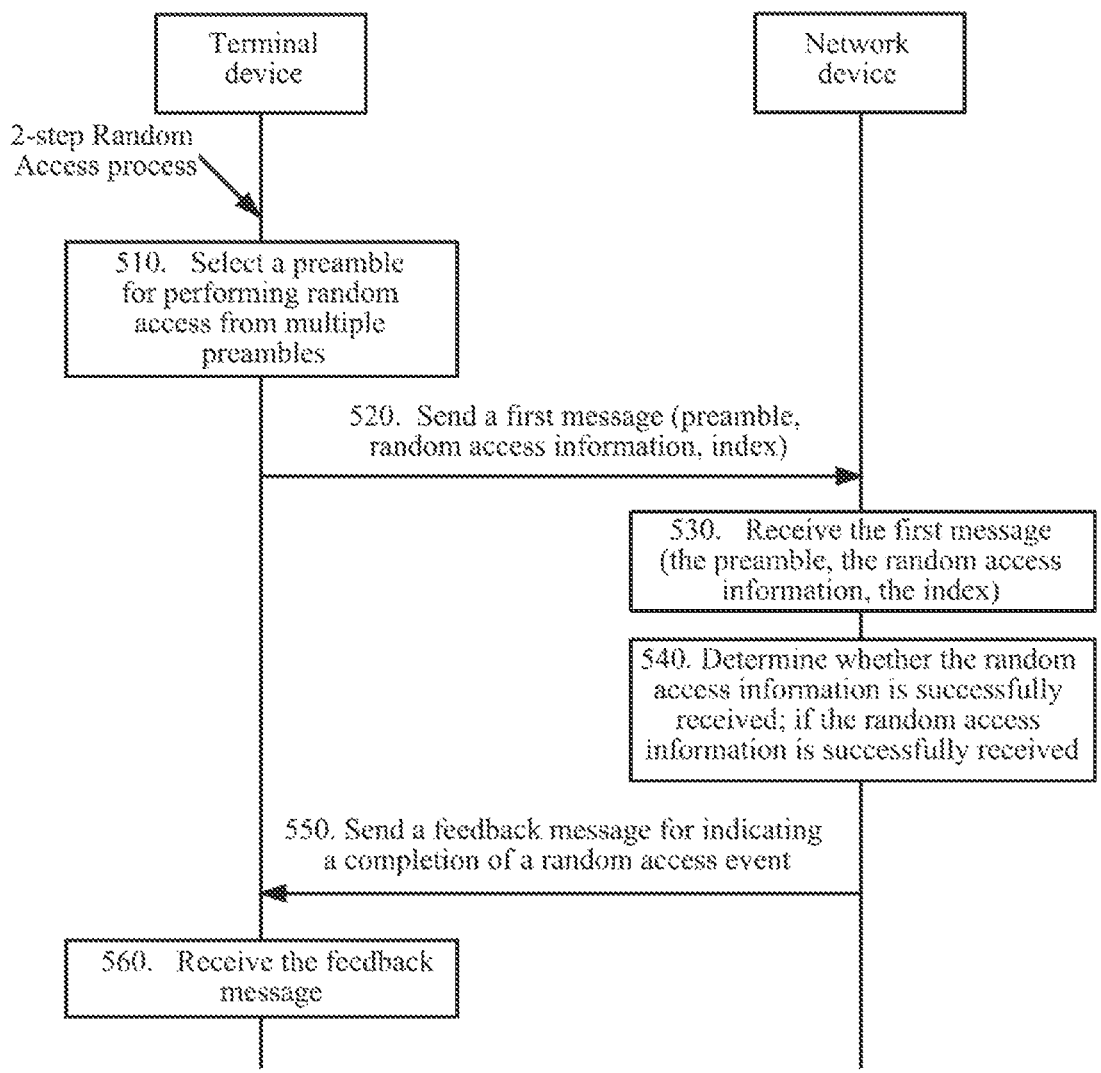
FIG. 5 is a flowchart of interaction in a random access method according to an implementation of the present disclosure.

FIG. 5 is a flowchart of interaction in a random access method 500 according to an implementation of the present disclosure. A terminal device in FIG. 5 may be, for example, the terminal device 20 shown in FIG. 1, and a network device in FIG. 5 may be, for example, the network device 10 shown in FIG. 1. As shown in FIG. 5, the specific flow of the random access includes: in 510, the terminal device selects randomly a preamble for the terminal device to perform random access from multiple preambles.

Specifically, when the terminal device initiates 2-step Random Access, the terminal device first determines its own preamble, and the terminal device may select randomly the preamble used for the terminal device itself to perform random access from multiple preambles. As the terminal device selects randomly a preamble, when different terminal devices make selection from multiple preambles, a probability that a collision of preambles occurs can be greatly reduced.

In 520, the terminal device sends a first message to the network device.

The first message includes the preamble, random access information, and an index for indicating a size of the random access information, wherein the random access information is control signaling related to Radio Resource Control (RRC) or data sent by the terminal device based on a random access event.

Specifically, for different random access events, namely triggering events, random access information sent by the terminal device is different. Optionally, the random access information includes any one of the following: an RRC Connection Request for performing initial access, RRC handover confirmation information (RRC Handover Confirm) for indicating a completion of a cell handover, an RRC Connection Re-establishment Request for requesting an RRC connection re-establishment, uplink data, and feedback information for downlink data.

For example, for a scenario of initial access, the random access information is an RRC connection request generated by an RRC layer, through which the terminal device initially establishes a wireless connection with a network, and the terminal device will change from an RRC IDLE state to an RRC CONNECTED state. For a handover scenario, the random access information is an RRC handover completion message generated by an RRC layer, at this time a UE needs to establish uplink synchronization with a new cell after handover. For a connection reestablishment scenario, the random access information is an RRC connection reestablishment request so that the terminal device reestablishes a wireless connection after a Radio Link Failure. For a scenario where uplink data arrive, for example, when it is necessary to report a measurement report or send user data, uplink transmission is "unsynchronized" or there is no available PUCCH resource for Reference Signal (SR) transmission, the random access information may be uplink data. When there is no available PUCCH resource for SR transmission, a terminal device that is already in an uplink synchronization state is allowed to use Random Access Channel (RACH) instead of SR to work. For a scenario where downlink data arrive, uplink transmission is not synchronized, and the random access information may be feedback information for the downlink data, such as Acknowledgement (ACK) or Negative Acknowledgement (NACK).

In 530, the network device receives the first message sent by the terminal device.

The first message includes the preamble, random access information, and an index for indicating a size of the random access information, wherein the random access information is control signaling related to Radio Resource Control (RRC) or data sent by the terminal device based on a random access event. For example, the random access information includes any one of the following: an RRC connection request for performing initial access, RRC handover confirmation information for indicating a completion of a cell handover, an RRC connection reestablishment request for requesting an RRC connection reestablishment, uplink data, and feedback information for downlink data.

In 540, the network device determines whether it successfully receives the random access information sent by the terminal device.

Specifically, if the network device successfully receives the random access information in the first message sent by the terminal device, then the network device executes 550 and 560.

In 550, the network device sends a feedback message for indicating a completion of the random access event to the terminal device according to the first message.

In 560, the terminal device receives the feedback message sent by the network device according to the first message.

Wherein, the feedback message is used for indicating the completion of the random access event.

Specifically, in 550 and 560, if the network device successfully receives the first message sent by the terminal device, i.e., the network device not only successfully receives the preamble in the first message, but also successfully receives the random access information for the random access event in the first message, then the network device may send feedback message to the terminal device according to the first message and indicate the completion of the random access event through the feedback message.

At this time, the network device may determine the index in the first message as invalid, since the network device has successfully received the random access information sent by the terminal device, so it is not necessary for the network device to configure transmission resources for the random access information, and it is not necessary to read the size of the random access information.

It should be understood that the feedback message may include feedback information for the random access information, and meanwhile may also include feedback information for the preamble, namely, a Random Access Response (RAR), the RAR may carry information such as a Time Advance (TA) value of the terminal device for performing, by the terminal device, minor adjustments.

It should also be understood that the network device receives successfully the random access information sent by the terminal device herein refers to that the network device receives successfully and decode correctly the random access information by the network device; that the network device does not successfully receive the random access information sent by the terminal device refers to that after the terminal device sends the first message, the network device does not receive the random access information in the first message, or the network device receives the random access information but does not correctly decode the random access information.

Figure 6:
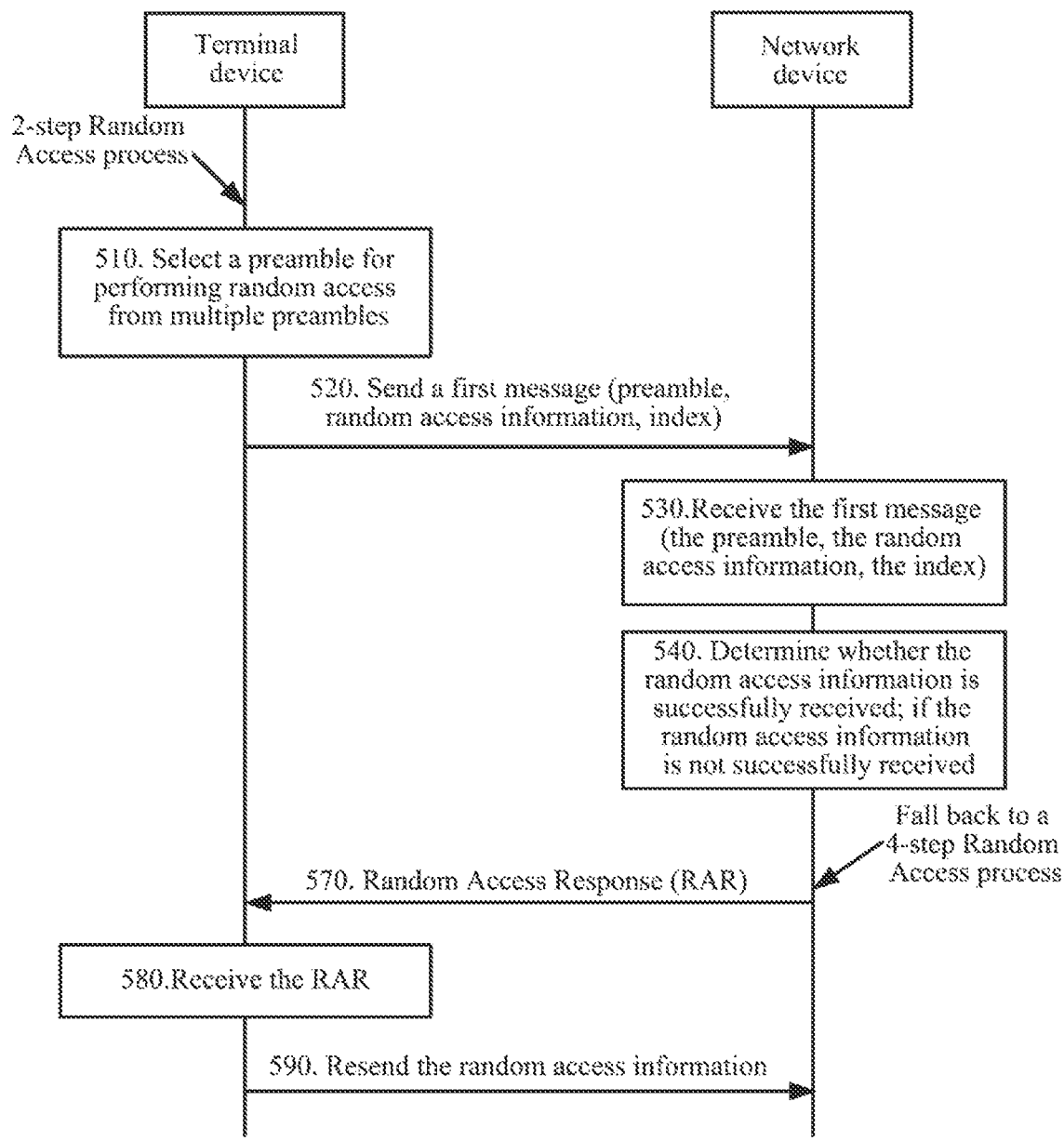
FIG. 6 is a flowchart of interaction in a random access method according to an implementation of the present disclosure.

If the network device does not successfully receive the random access information in the first message sent by the terminal device, then as the random access process shown in FIG. 6, the network device and the terminal device execute 570 to 590. At this time, the terminal device needs to fall back to the 4-step Random Access process from the 2-step Random Access process initiated in 510 to resend the random access information.

In 570, the network device sends a Random Access Response (RAR) to the terminal device.

The RAR includes uplink resource information for the terminal device to resend the random access information.

In 580, the terminal device receives the Random Access Response message RAR sent by the network device according to the index. Wherein, the RAR includes uplink resource information for the terminal device to resend, the random access information.

Specifically, if the network device does not successfully receive the random access information in the first message sent by the terminal device, at this time as the terminal device needs to fall back to the 4-step Random Access process from the 2-step Random Access process so as to resend the random access information, while the random access information is for scheduled transmission in the 4-step Random Access process, the network device needs to configure uplink resources used for resending the random access information for the terminal device according to the size of the random access information indicated by the index in the first message.

A size of contents of the random access information may vary according to different random access events. For example, for four triggering events, i.e. initial access, handover, reestablishment, and arrival of uplink/downlink data, the size of the contents of the random access information may be, for example, 56 bits, 144 bits, 208 bits, and 256 bits respectively. However, in order to promote a utilization of preambles of random access, reduce a probability of collisions, and improve performance of random access, equipment manufacturers usually add redundant bits to the random access information, so the size of the random access information will also change.

The network device obtains the size of the random access information according to the index in the first message, and determines RAR according to the size of the random access information, thereby sending the RAR to the terminal device. In addition to information of resource granting by the network device to the random access information, the RAR may include information such as a TA value used for performing, by the terminal device, synchronization. After receiving the RAR, the terminal device may resend the random access information to the network device according to the RAR.

In 590, the terminal device resends the random access information to the network device according to the RAR.

Specifically, after receiving the RAR, the terminal device may resend the random access information to the network device according to the RAR. The random access information is sent to the network device through Scheduled Transmission to complete Contention Resolution. After receiving the access information, the network device may send a feedback message to the terminal device according to the access information and indicate completion of the random access event through the feedback message.

For example, if the random access information resent by the terminal device to the network device is an RRC connection request for performing initial access, then the network device may feed back an RRC connection completion message to the terminal device to inform the terminal device that an initial connection completes. If the random access information is an RRC connection reestablishment request, then the network device may feed back an RRC reestablishment completion message to the terminal device to inform the terminal device that a reestablishment of the connection has been completed. Of course, if the random access information is uplink data or feedback information for downlink data, the network device may not send the feedback information to the terminal device.

It should be understood that the random access information may be equivalent to Msg 3 sent in a 4-step Random Access process when the terminal device initiates the 4-step Random Access for a same random access event. However, it is different from the Msg 3 in 4-step Random Access in that in 2-step Random Access, when the random access information is sent to the network device with the preamble being sent to the network device simultaneously, it is not a scheduled transmission, and it is a scheduled transmission only when the terminal device resends the random access information after falling back to the 4-step Random Access from the 2-step Random Access.

Therefore, in an implementation of the present disclosure, a terminal device can randomly select a preamble from all preambles to perform a 2-step Random Access process. And when the terminal device sends the preamble and random access information for different random access events, by indicating a size of the random access information to a network device, the network device is enabled to grant uplink resources to the terminal device according to the size of the random access information when the terminal device falls back to 4-step Random Access from the 2-step Random Access. Thus the terminal device resends the random access information through the 4-step Random Access, and meanwhile, a probability that a confliction of preambles of terminal devices occurs in a random access process is reduced.

Optionally, before 510, namely, before the terminal device sends the first message to the network device, the method further includes: the terminal device determines the index corresponding to the size of the random access information according to the size of the random access information and a first mapping relationship, wherein the first mapping relationship includes a corresponding relationship between multiple data sizes and multiple index values.

Further, before the terminal device determines the index corresponding to the size of the random access information, the method further includes: the network device sends a first mapping relationship to the terminal device; the terminal device receives indication information sent by the network device, wherein the indication information is used for indicating the first mapping relationship.

That is, there is a mapping relationship directly between the index in the first message and Data Size, which may be indicated to the terminal device by the network device through a system message. The index is only used as a reference for performing, by the network device, resource granting after the network device fails in decoding the random access information. That is, when the network device only successfully receives a preamble, but does not successfully receive random access information and needs to fall back to 4-step Random Access, the network device may use the index carried in the first message as a reference for granting random access information, and the terminal device may continue the 4-step Random Access process according to a grant in RAR. On the contrary, if the network device successfully receives a preamble and random access information, then the index may be determined to be invalid.

It should be understood that in various implementations of the present disclosure, sizes of sequence numbers in the above-mentioned processes do not imply an order of execution, and an order of execution of the processes should be determined by functions and internal logics of the processes, while it should not constitute any limitation on implementation processes of implementations of the present disclosure.

Figure 7:
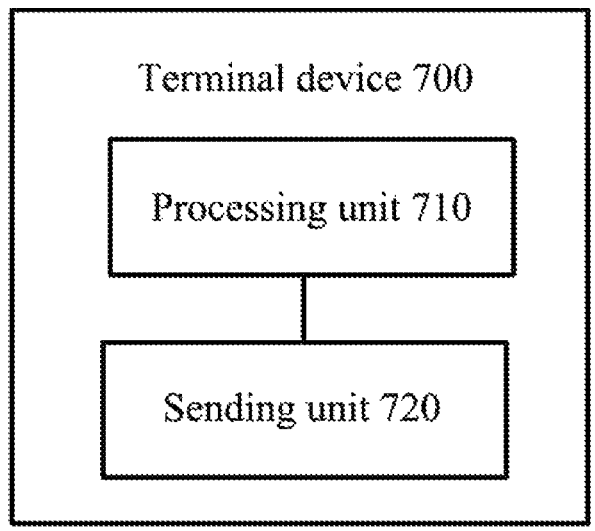
FIG. 7 is a schematic structural diagram of a terminal device according to an implementation of the present disclosure.

FIG. 7 is a schematic structural diagram of a terminal device 700 according to an implementation of the present disclosure. As shown in FIG. 7, the terminal device 700 includes a processing unit 710 and a sending unit 720.

The processing unit 710 is used for selecting randomly a preamble for the terminal device to perform random access from multiple preambles.

The sending unit 720 is used for sending a first message to a network device, wherein the first message includes the preamble selected by the processing unit, random access information, and an index indicating a size of the random access information, and the random access information is control signaling related to Radio Resource Control (RRC) or data sent by the terminal device based on a random access event.

Therefore, in an implementation of the present disclosure, a terminal device can randomly select a preamble from all preambles to perform a 2-step Random Access process. And when the terminal device sends the preamble and random access information for different random access events, by indicating a size of the random access information to a network device, the network device is enabled to grant uplink resources to the terminal device according to the size of the random access information when the terminal device falls back to 4-step Random Access from the 2-step Random Access. Thus the terminal device resends the random access information through the 4-step Random Access, and meanwhile, a probability that a confliction of preambles of terminal devices occurs in a random access process is reduced.

Optionally, the random access information includes any one of the following: an RRC connection request for performing initial access, RRC handover confirmation information for indicating a completion of a cell handover, an RRC connection reestablishment request for requesting an RRC connection reestablishment, uplink data, and feedback information for downlink data.

Optionally, the terminal device further includes a receiving unit, used for: when the network device does not successfully receive the random access information, receiving a Random Access Response (RAR) sent by the network device according to the index, wherein the RAR includes uplink resource information for the terminal device to resend the random access information. The terminal device resends the random access information to the network device according to the RAR.

Optionally, the terminal device further includes a receiving unit, used for: when the network device successfully receives the random access information, receiving a feedback message sent by the network device according to the first message, wherein the feedback message is used for indicating a completion of the random access event.

Optionally, the processing unit 710 is further used for: before the terminal device sends a first message to the network device, determining the index corresponding to the size of the random access information according to the size of the random access information and a first mapping relationship, wherein the first mapping relationship includes a corresponding relationship between multiple data sizes and multiple index values.

Optionally, the receiving unit is further used for: before the terminal device determines the index corresponding to the size of the random access information, receiving indication information sent by the network device, wherein the indication information is used for indicating the first mapping relationship.

It should be understood that the terminal device 700 may correspond to a terminal device in a method implementation and may implement corresponding functions of the terminal device. For the sake of conciseness, it will not be repeated here.

Figure 8:
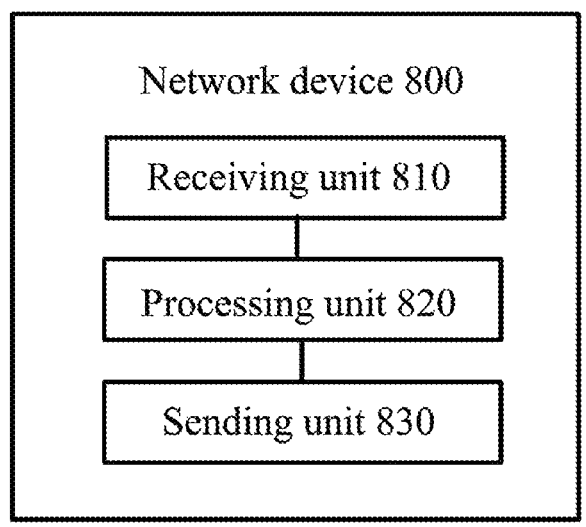
FIG. 8 is a schematic structural diagram of a network device according to an implementation of the present disclosure.

FIG. 8 is a schematic structural diagram of a network device 800 according to an implementation of the present disclosure. As shown in FIG. 8, the network device 800 includes a receiving unit 810, a processing unit 820, and a sending unit 830.

The receiving unit 810 is used for receiving a first message sent by a terminal device, wherein the first message includes a preamble for random access, random access information, and an index for indicating a size of the random access information, and the random access information is control signaling related to Radio Resource Control (RRC) or data sent by the terminal device based on a random access event.

The processing unit 820 is used for determining whether the receiving unit 810 successfully receives the random access information sent by the terminal device.

The sending unit 830 is used for, when the processing unit 820 determines that the receiving unit 810 successfully receives the random access information sent by the terminal device, sending a feedback message for indicating a completion of the random access event to the terminal device according to the first message; or the sending unit 830 is used for, when the processing unit 820 determines that the receiving unit 810 does not successfully receive the random access information sent by the terminal device, sending a Random Access Response (RAR) to the terminal device, wherein the RAR includes uplink resource information for the terminal device to resend the random access information.

Therefore, in an implementation of the present disclosure, a terminal device can randomly select a preamble from all preambles to perform a 2-step Random Access process. And when the terminal device sends the preamble and random access information for different random access events, by indicating a size of the random access information to a network device, the network device is enabled to grant uplink resources to the terminal device according to the size of the random access information when the terminal device falls back to 4-step Random Access from the 2-step Random Access, Thus the terminal device resends the random access information through the 4-step Random Access, and meanwhile, a probability that a confliction of preambles of terminal devices occurs in a random access processes is reduced.

Optionally, the random access information includes any one of the following: an RRC connection request for performing initial access, RRC handover confirmation information for indicating a completion of a cell handover, an RRC connection reestablishment request for requesting an RRC connection reestablishment, uplink data, and feedback information for downlink data.

Optionally, the sending unit 830 is further used for: before the network device receives the first message sent by the terminal device, sending a first mapping relationship to the terminal device, wherein the first mapping relationship includes a corresponding relationship between multiple data sizes and multiple index values, so that the terminal device determines the index corresponding to the size of the random access information according to the size of the random access information and the first mapping relationship.

Figure 9:
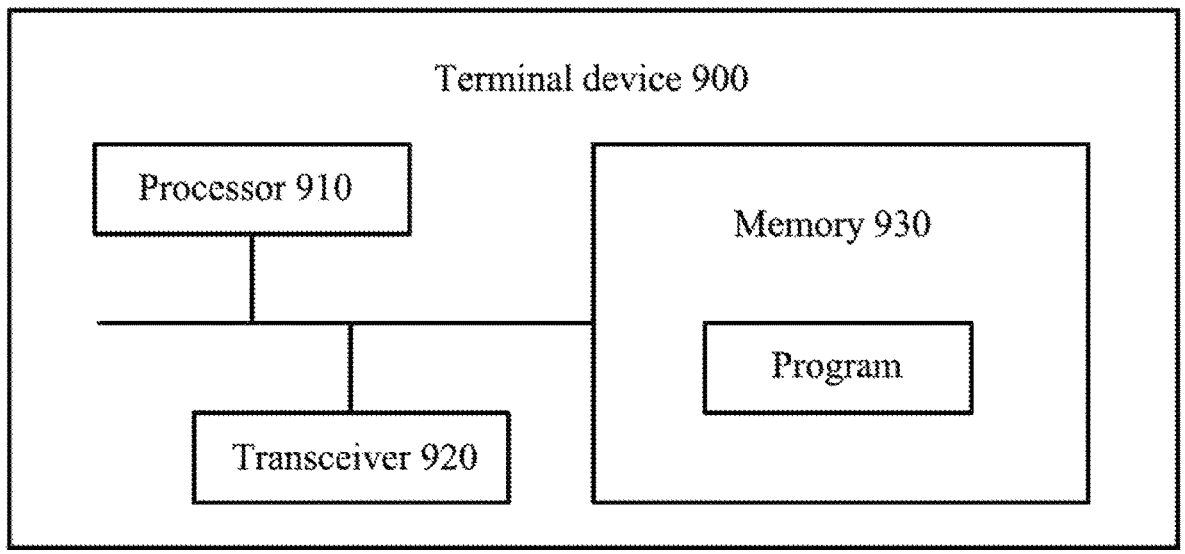
FIG. 9 is a schematic structural diagram of a terminal device according to an implementation of the present disclosure.

FIG. 9 is a schematic structural diagram of a terminal device 900 according to an implementation of the present disclosure. As shown in FIG. 9, the terminal device includes a processor 910, a transceiver 920, and a memory 930, wherein the processor 910, the transceiver 920, and the memory 930 communicate with each other through internal connection paths. The memory 930 is used for storing instructions, and the processor 910 is used for executing the instructions stored in the memory 930 to control the transceiver 920 to receive signals or send signals.

The processor 910 is used for randomly selecting a preamble for the terminal device to perform random access from multiple preambles.

The transceiver 920 is used for sending a first message to a network device, wherein the first message includes the preamble selected by the processor, random access information, and an index indicating a size of the random access information, and the random access information is control signaling related to Radio Resource Control (RRC) or data sent by the terminal device based on a random access event.

Optionally, the random access information includes any one of the following: an RRC connection request for performing initial access, RRC handover confirmation information for indicating a completion of a cell handover, an RRC connection reestablishment request for requesting an RRC connection reestablishment, uplink data, and feedback information for downlink data.

Optionally, the transceiver 920 is further used for: when the network device does not successfully receive the random access information, receiving a Random Access Response (RAR) sent by the network device according to the index, wherein the RAR includes uplink resource information for the terminal device to resend the random access information. The terminal device resends the random access information to the network device according to the RAR.

Optionally, the transceiver 920 is further used for: when the network device successfully receives the random access information, receiving a feedback message sent by the network device according to the first message, and the feedback message is used for indicating a completion of the random access event.

Optionally, the processor 910 is further used for: before the terminal device sends the first message to the network device, determining the index corresponding to the size of the random access information according to the size of the random access information and a first mapping relationship, wherein the first mapping relationship includes a corresponding relationship between multiple data sizes and multiple index values.

Optionally, the transceiver 920 is further used for: before the terminal device determines the index corresponding to the size of the random access information, receiving indication information sent by the network device, wherein the indication information is used for indicating the first mapping relationship.

It should be understood that, in an implementation of the present disclosure, the processor 910 may be a central processing unit (CPU), or the processor 910 may be other general purpose processor, a digital signal processor (DSP), an application specific integrated circuit (ASIC), an off-the-shelf programmable gate array (FPGA) or other programmable logic device, a discrete gate or a transistor logic device, or a discrete hardware component, etc. The general purpose processor may be a microprocessor or the processor may be any conventional processor or the like.

The memory 930 may include a read-only memory and a random access memory, and may provide instructions and data to the processor 910. A portion of the memory 930 may also include a non-volatile random access memory. For example, the memory 930 may also store information of a device type.

In a realization process, acts of the methods described above may be accomplished by integrated logic circuits of hardware in the processor 910 or instructions in the form of software. The acts of the random access method disclosed in connection with an implementation of the present disclosure may be directly embodied by completion of execution by a hardware processor, or by completion of execution by a combination of hardware and software modules in the processor 910. The software modules may be located in a storage medium commonly used in the art, such as a random access memory, a flash memory, a read-only memory, a programmable read-only memory or an electrically erasable programmable memory, or a register. The storage medium is located in the memory 930, and the processor 910 reads the information in the memory 930 and accomplishes the acts of the above method in combination with its hardware. In order to avoid repetition, it will not be described in detail here.

The terminal device 900 according to an implementation of the present disclosure may correspond to the terminal device used for executing the method 500 in the above-mentioned method 500 and the terminal device 700 according to an implementation of the present disclosure, and various units or modules in the terminal device 900 are respectively used for executing various acts or processing processes executed by the terminal device in the above-mentioned method 500. Here, in order to avoid repetition, detailed description thereof is omitted.

Figure 10:
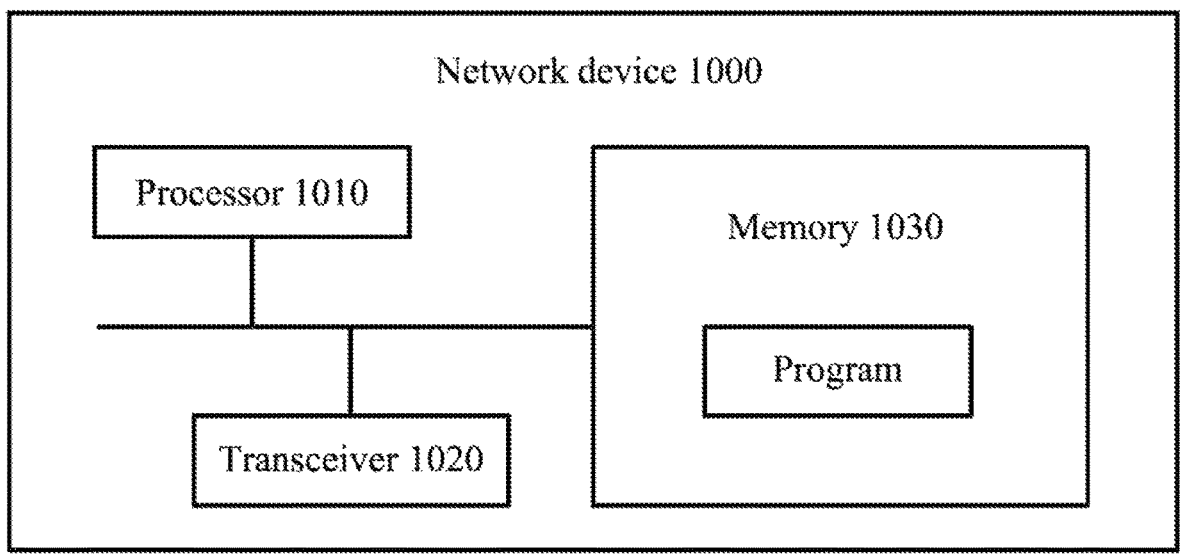
FIG. 10 is a schematic structural diagram of a network device according to an implementation of the present disclosure.

FIG. 10 is a schematic structural diagram of a network device 1000 according to an implementation of the present disclosure. As shown in FIG. 10, the network device includes a processor 1010, a transceiver 1020 and a memory 1030, wherein the processor 1010, the transceiver 1020 and the memory 1030 communicate with each other through internal connection paths. The memory 1030 is used for storing instructions, and the processor 1010 is used for executing the instructions stored in the memory 1030 to control the transceiver 1020 to receive signals or send signals.

The transceiver 1020 is used for receiving a first message sent by a terminal device, wherein the first message includes a preamble for random access, random access information, and an index for indicating a size of the random access information, and the random access information is control signaling related to Radio Resource Control (RRC) or data sent by the terminal device based on a random access event.

The processor 1010 is used for determining whether the transceiver 1020 successfully receives the random access information sent by the terminal device.

The transceiver 1020 is used for sending a feedback message for indicating a completion of the random access event to the terminal device according to the first message when the processor 1010 determines that the transceiver 1020 successfully receives the random access information sent by the terminal device; or the transceiver 1020 is used for sending a Random Access Response (RAR) to the terminal device when the processor 1010 determines that the transceiver 1020 does not successfully receive the random access information sent by the terminal device, wherein the RAR includes uplink resource information for the terminal device to resend the random access information.

Therefore, in an implementation of the present disclosure, a terminal device can select randomly a preamble from all preambles to perform a 2-step Random Access process. And when the terminal device sends the preamble and random access information for different random access events, by indicating a size of the random access information to a network device, the network device is enabled to grant uplink resources to the terminal device according to the size of the random access information when the terminal device falls back to 4-step Random Access from the 2-step Random Access. Thus the terminal device resends the random access information through the 4-step Random Access, and meanwhile, a probability that a confliction of preambles of terminal devices occurs in a random access processes is reduced.

Optionally, the random access information includes any one of the following: an RRC connection request for performing initial access, RRC handover confirmation information for indicating a completion of a cell handover, an RRC connection reestablishment request for requesting an RRC connection reestablishment, uplink data, and feedback information for downlink data.

Optionally, the transceiver 1020 is further used for: before the network device receives the first message sent by the terminal device, sending a first mapping relationship to the terminal device, wherein the first mapping relationship includes a corresponding relationship between multiple data sizes and multiple index values, so that the terminal device determines the index corresponding to the size of the random access information according to the size of the random access information and the first mapping relationship.

It should be understood that, in an implementation of the present disclosure, the processor 1010 may be a Central Processing Unit (CPU), or the processor 1010 may also be other general purpose processor, a Digital Signal Processor (DSP), an Application Specific Integrated Circuit (ASIC), a Field Programmable Gate Array (FPGA) or other programmable logic device, a discrete gate or a transistor logic device, a discrete hardware component, etc. The general purpose processor may be a microprocessor or the processor may be any conventional processor or the like.

The memory 1030 may include a read-only memory and a random access memory, and provide instructions and data to the processor 1010. A portion of the memory 1030 may also include a non-volatile random access memory. For example, the memory 1030 may also store information of a device type.

In a realization process, acts of the methods described above may be accomplished by integrated logic circuits of hardware in the processor 1010 or instructions in the form of software. The acts of the random access method disclosed in connection with an implementation of the present disclosure may be directly embodied by completion of execution by a hardware processor, or by completion of execution by a combination of hardware and software modules in the processor 1010. The software modules may be located in a storage medium commonly used in the art, such as a random access memory, a flash memory, a read-only memory, a programmable read-only memory or an electrically erasable programmable memory, or a register. The storage medium is located in the memory 1030, and the processor 1010 reads the information in the memory 1030 and accomplishes the acts of the above method in combination with its hardware. In order to avoid repetition, it will not be described in detail here.

The network device 1000 according to an implementation of the present disclosure may correspond to the network device used for executing the method 500 in the above-mentioned method 500 and the network device 800 according to an implementation of the present disclosure, and various units or modules in the network device 1000 are respectively used for executing various acts or processing processes executed by the network device in the above-mentioned method 500. Here, in order to avoid repetition, detailed description thereof is omitted.

Figure 11:
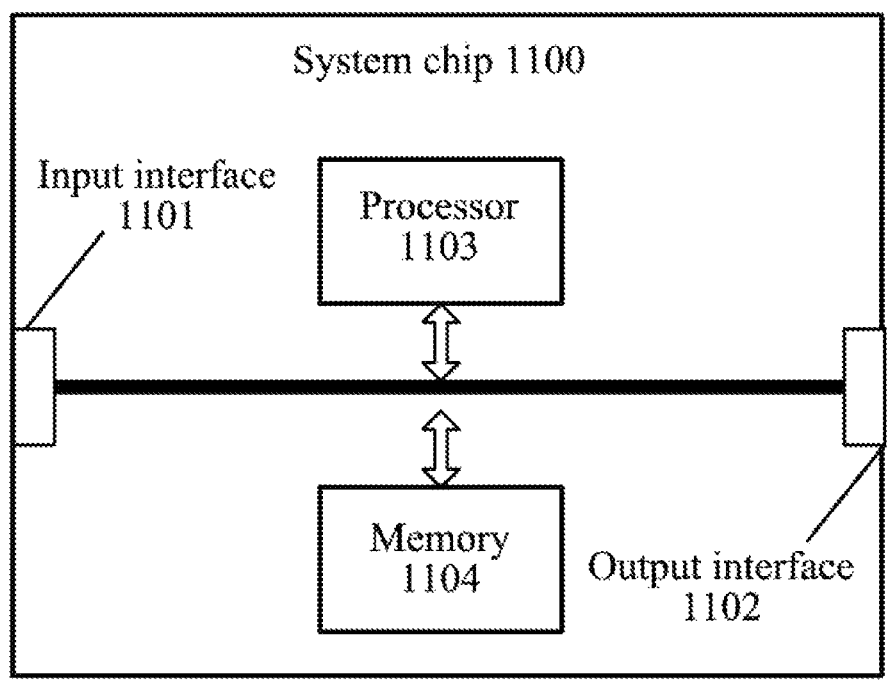
FIG. 11 is a schematic structural diagram of a system chip according to an implementation of the present disclosure.

FIG. 11 is a schematic structural diagram of a system chip according to an implementation of the present disclosure. The system chip 1100 of FIG. 11 includes an input interface 1101, an output interface 1102, at least one processor 1103, and a memory 1104, wherein the input interface 1101, the output interface 1102, the processor 1103, and the memory 1104 are connected to each other through internal connection paths. The processor 1103 is used for executing codes in the memory 1104.

Optionally, when the codes are executed, the processor 1103 may implement the method 500 which is executed by the terminal device in a method implementation. For the sake of conciseness, it will not be repeated here.

Optionally, when the codes are executed, the processor 1103 may implement the method 500 which is executed by the network device in a method implementation. For the sake of conciseness, it will not be repeated here.

Those of ordinary skill in the art will recognize that the exemplary units and algorithm acts described in connection with the implementations disclosed herein can be implemented in electronic hardware, or a combination of computer software and electronic hardware. Whether these functions are implemented in hardware or software depends on a specific application and design constraint of the technical solution. Skilled in the art may use different methods to realize the described functions for each particular application, but such realization should not be considered to be beyond the scope of the present disclosure.

Those skilled in the art may clearly understand that for convenience and conciseness of description, specific working processes of the system, apparatus and unit described above may refer to corresponding processes in the aforementioned implementations of methods, which will not be repeated here.

In several implementations provided by the present disclosure, it should be understood that the disclosed system, apparatus and method may be implemented in other ways. For example, the apparatus implementation described above is only illustrative, for example, the categorization of the unit is only a logical function division, and there may be other ways for categorization in actual implementation. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separate components may or may not be physically separated, and the components shown as units may or may not be physical units, i.e., they may be located in one place or may be distributed over multiple network units. Some or all of the units may be selected according to practical needs to achieve the purpose of the implementations.

In addition, various functional units in various implementations of the present disclosure may be integrated in one processing unit, or various units may be physically present separately, or two or more units may be integrated in one unit.

If realized in a form of software functional unit and sold or used as a separate product, the function may be stored in a computer readable storage medium. Based on this understanding, the technical solution of the present disclosure, in essence, or a part contributing to the prior art, or a part of the technical solution, may be embodied in the form of a software product. The computer software product is stored in a storage medium and includes several instructions used for causing a computer device (which may be a personal computer, a server, or a network device, etc.) to perform all or part of acts of the methods of various implementations of the present disclosure. The aforementioned storage medium include various media capable of storing program codes such as U disk, mobile hard disk, Read-Only memory (ROM), Random Access memory (RAM), magnetic disk or optical disk.

The foregoing are merely exemplary implementations of the present disclosure, but the protection scope of implementations of the present disclosure is not limited thereto. Any person skilled in the art can easily conceive changes or substitutions within the technical scope disclosed by the implementations of the present disclosure, which should be included within the protection scope of the implementations of the present disclosure. Therefore, the protection scope of implementations of the present disclosure should be subject to the protection scope of claims.

What is claim is:

1. A method for random access, comprising:
    selecting randomly, by a terminal device, a preamble for the terminal device to perform random access from a plurality of preambles; and
    sending, by the terminal device, a first message to a network device, wherein the first message comprises the preamble, random access information, and an index for indicating a size of the random access information, and the random access information is control signaling related to Radio Resource Control (RRC) sent by the terminal device or data sent by the terminal device based on a random access event.

2. The method of claim 1, wherein the random access information comprises any one of the following:
    an RRC connection request for performing initial access, RRC handover confirmation information for indicating a completion of a cell handover, an RRC connection reestablishment request for requesting an RRC connection reestablishment, uplink data, and feedback information for downlink data.

3. The method of claim 1, wherein when the network device does not successfully receive the random access information, the method further comprises:
    receiving, by the terminal device, a Random Access Response (RAR) sent by the network device according to the index, wherein the RAR comprises uplink resource information for the terminal device to resend the random access information; and
    resending, by the terminal device, the random access information to the network device according to the RAR.

4. The method of claim 1, wherein when the network device successfully receives the random access information, the method further comprises:
    receiving, by the terminal device, a feedback message sent by the network device according to the first message, wherein the feedback message is used for indicating a completion of the random access event.

5. The method of claim 1, further comprising:
    before the terminal device sends the first message to the network device,
    determining, by the terminal device, the index corresponding to the size of the random access information according to the size of the random access information and a first mapping relationship, wherein the first mapping relationship comprises a corresponding relationship between a plurality of data sizes and a plurality of index values.

6. The method of claim 5, further comprising:
    before the terminal device determines the index corresponding to the size of the random access information,
    receiving, by the terminal device, indication information sent by the network device, wherein the indication information is used for indicating the first mapping relationship.

7. The method of claim 2, wherein when the network device does not successfully receive the random access information, the method further comprises:
    receiving, by the terminal device, a Random Access Response (RAR) sent by the network device according to the index, wherein the RAR comprises uplink resource information for the terminal device to resend the random access information; and
    resending, by the terminal device, the random access information to the network device according to the RAR.

8. The method of claim 2, wherein when the network device successfully receives the random access information, the method further comprises:
receiving, by the terminal device, a feedback message sent by the network device according to the first message, wherein the feedback message is used for indicating a completion of the random access event.

9. A non-transitory computer readable storage medium, comprising a computer program that is executable by a terminal device to implement the method of claim 1.

10. A terminal device, comprising: a processor and a transceiver, wherein the processor and the transceiver communicate with each other,
the processor is configured to select randomly a preamble for the terminal device to perform random access from a plurality of preambles; and
the transceiver is configured to send a first message to a network device, wherein the first message comprises the preamble selected by the processor, random access information, and an index indicating a size of the random access information, and the random access information is control signaling related to Radio Resource Control (RRC) sent by the terminal device or data sent by the terminal device based on a random access event.

11. The terminal device of claim 10, wherein the random access information comprises any one of the following:
an RRC connection request for performing initial access, RRC handover confirmation information for indicating a completion of a cell handover, an RRC connection reestablishment request for requesting an RRC connection reestablishment, uplink data, and feedback information for downlink data.

12. The terminal device of claim 10, wherein the transceiver is further configured to:
receive a Random Access Response (RAR) sent by the network device according to the index when the network device does not successfully receive the random access information, wherein the RAR comprises uplink resource information for the terminal device to resend the random access information; and
resend the random access information to the network device according to the RAR.

13. The terminal device of claim 10, wherein the transceiver is further configured to:
receive a feedback message sent by the network device according to the first message when the network device successfully receives the random access information, wherein the feedback message is used for indicating a completion of the random access event.

14. The terminal device of claim 10, wherein the processor is further configured to:
determine the index corresponding to the size of the random access information according to the size of the random access information and a first mapping relationship before the transceiver sends the first message to the network device, wherein the first mapping relationship comprises a corresponding relationship between a plurality of data sizes and a plurality of index values.

15. The terminal device of claim 14, wherein the transceiver is further configured to:
receive indication information sent by the network device before the processor determines the index corresponding to the size of the random access information, wherein the indication information is used for indicating the first mapping relationship.

16. The terminal device of claim 11, wherein the transceiver is further configured to:
receive a Random Access Response (RAR) sent by the network device according to the index when the network device does not successfully receive the random access information, wherein the RAR comprises uplink resource information for the terminal device to resend the random access information; and
resend the random access information to the network device according to the RAR.

17. The terminal device of claim 11, wherein the transceiver is further configured to:
receive a feedback message sent by the network device according to the first message when the network device successfully receives the random access information, wherein the feedback message is used for indicating a completion of the random access event.

18. The terminal device of claim 11, wherein the processor is further configured to:
determine the index corresponding to the size of the random access information according to the size of the random access information and a first mapping relationship before the transceiver sends the first message to the network device, wherein the first mapping relationship comprises a corresponding relationship between a plurality of data sizes and a plurality of index values.

19. The terminal device of claim 12, wherein the processor is further configured to:
determine the index corresponding to the size of the random access information according to the size of the random access information and a first mapping relationship before the transceiver sends the first message to the network device, wherein the first mapping relationship comprises a corresponding relationship between a plurality of data sizes and a plurality of index values.

20. The terminal device of claim 13, wherein the processor is further configured to:
determine the index corresponding to the size of the random access information according to the size of the random access information and a first mapping relationship before the transceiver sends the first message to the network device, wherein the first mapping relationship comprises a corresponding relationship between a plurality of data sizes and a plurality of index values.

* * * * *